Oct. 12, 1937.　　　　R. A. DENNE　　　　2,095,925
FIRE EXTINGUISHING APPARATUS
Filed Dec. 30, 1936
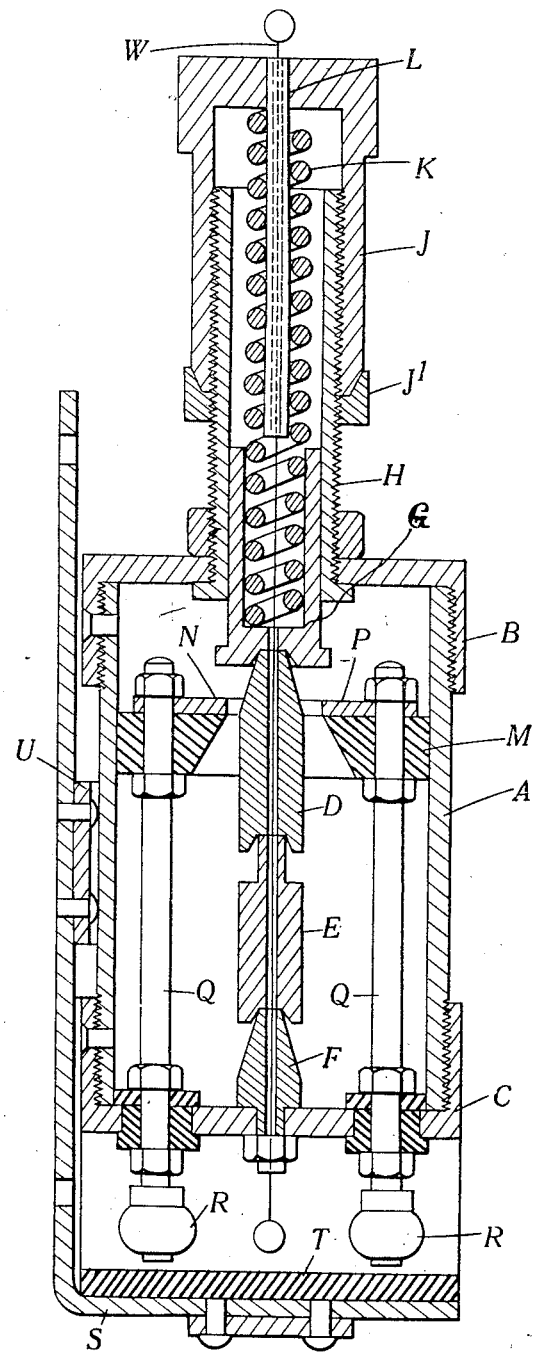
INVENTOR
R. A. DENNE.
BY
ATTORNEYS Patented Oct. 12, 1937

2,095,925

UNITED STATES PATENT OFFICE 2,095,925

FIRE EXTINGUISHING APPARATUS

Richard Alured Denne, Richmond, England, assignor to The National Fire Protection Company, Limited, Richmond, Surrey, England, a company of Great Britain Application December 30, 1936, Serial No. 118,421
In Great Britain December 10, 1935

2 Claims. (Cl. 200—52)

This invention relates to fire-extinguishing apparatus of the kind in which the release of a fire-extinguishing fluid is controlled by an inertia or equivalent control device which operates when the movement of an aeroplane, motorcar or other moving vehicle or the like carrying the apparatus is altered abruptly, as by an impact or collision or by overturning of the vehicle.

The invention is more particularly concerned with an improved form of inertia control device and has as its main object to provide such a device which is robust, cheap and simple to manufacture, can be easily and accurately adjusted, and can readily be reset after operation.

According to the present invention the inertia control device comprises two or more struts arranged substantially in line to constitute a toggle and subjected to endwise pressure, the struts being so constituted and arranged as to collapse and initiate release of extinguishing fluid when the lateral inertia force, due to lateral acceleration of the device, exceeds a predetermined value.

The struts may be mounted end to end in abutting engagement with each other. Again the struts may be mounted between a pair of relatively movable abutments which are urged towards one another, at least one of the abutments being in abutting engagement with the end of the strut adjacent to it. Conveniently at least one pair of abutting surfaces is flat. It will be appreciated that if the struts and abutments have flat abutting surfaces the toggle will be in stable equilibrium so as to resist lateral movement in any direction. This condition applies so long as the toggle is in its central position with the struts in line, but if the lateral inertia force exceeds a predetermined value this resistance can be overcome and such lateral movement can take place in any direction in which the force acts. Such movement will bring the toggle out of dead centre and thereafter the toggle will collapse.

Means is preferably provided to prevent relative lateral shifting of the ends in abutting contact, for example there may be a recess in the end of one member in which the end of the companion member rests.

Any suitable arrangement may be provided for resetting the toggle after operation but preferably this is effected by a flexible wire or the equivalent which passes through bores in the struts and abutments, the wire normally being slack so as not to impede collapse of the toggle.

One of the abutments, which is movable, may be arranged to actuate means for releasing the extinguishing fluid on the collapse of the toggle, such means preferably including normally open contacts in an electric control circuit, which contacts are closed by the movable abutment when the toggle collapses.

The invention may be carried into effect in various ways but one specific embodiment will be described by way of example with reference to the accompanying drawing which is a central longitudinal section through one form of inertia control device.

In this construction the device comprises a cylindrical casing A with top and bottom covers B and C respectively. The toggle is constituted by a pair of struts D and E held between a lower abutment F, fixed to the bottom cover, and a movable upper abutment constituted by a sleeve G which slides in a fixed guide H mounted in the upper cover B. The guide H is externally screw-threaded and fitted with a correspondingly threaded cap J having a locking ring $J^1$ and a helical spring K is interposed between the top of the cap J and the lower end of the sleeve G so as to press the latter downwardly. A guiding tube L projects through the cap J and extends within the spring K.

Within the casing A is mounted an insulating ring M carrying a pair of more or less semi-annular contacts N and P. These are connected to conducting posts Q which pass through insulating bushings in the bottom cover C of the casing and carry terminals R at their lower ends. The contacts N and P are so positioned that when the toggle collapses and the sleeve G is moved downwardly by the spring K the lower end of the sleeve will bridge the contacts and close the electric circuit in which they are connected.

The shape of the abutting surfaces of the toggle struts and abutments engaging them will be clear from the drawing. Thus each of the struts and the sleeve G has in its lower face a recess of which the sides are chamfered to the form of a cone. The upper end of the lower strut E is of reduced uniform diameter corresponding to that of the recess in the lower end of the strut D. Similarly the upper ends of the lower abutment F and of the upper strut D are conically tapered down to a corresponding diameter. Thus the recesses ensure that no relative lateral shifting of the interengaging surfaces can occur but at the same time they do not interfere with a pivoting movement about any point on the periphery of the circle of engagement.

The device is mounted in a suitable bracket S arranged for example to be secured to a wall of a vehicle and having an insulating member T fixed in its lower part to prevent accidental electrical connection with the terminals R and a pair of spring arms which partially embrace the casing A of the device and are fixed to the bracket as shown at U.

In operation the device is mounted substantially vertically in the aeroplane or other moving vehicle fitted with the fire extinguishing apparatus and the terminals R are connected in an operating circuit for the fire extinguishing apparatus. This circuit may include an ignition device for an explosive capsule operating the plunger or the equivalent of a fire extinguisher, or a solenoid controlling a valve or other means for releasing the fluid.

The particular conditions under which the toggle will collapse will depend on the dimensions of the toggle and on the spring pressure and these will be varied in accordance with circumstances. In the particular construction described it may be mentioned that each of the toggle struts has an overall length of three-quarters of an inch, its lower end being recessed to a depth of one-sixteenth of an inch. The external diameter of the struts is a quarter of an inch and the diameter of the reduced portion or circle of engagement is one-eighth of an inch. The pressure applied by the spring can be varied to a considerable extent by screwing up or down the cap J of which the screwthreads are preferably of the micrometer type, for example having forty threads to the inch, so that the force exerted by the spring can be accurately adjusted.

Preferably a flexible filament or wire W or the equivalent is passed completely through longitudinal bores in the guiding tube L, the sleeve G, the struts D and E and the abutment F for the purpose of resetting the toggle after it has been collapsed. The wire may have some slack, for example at its lower end, in order not to interfere with the collapsing of the toggle.

It is preferred to employ an electric control circuit since it enables the device to be disposed on the vehicle in any suitable position remote from the fire extinguishing apparatus and, furthermore, with such an arrangement it is possible to connect, in parallel with the contacts of the inertia device, thermally responsive switches and other control devices for initiating the operation of the fire extinguishing apparatus without affecting the form or operation of the inertia device.

What I claim as my invention and desire to secure by Letters Patent is:—

1. In fire extinguishing apparatus, an inertia control device comprising at least two struts mounted substantially in line end to end in abutting engagement with each other to constitute a toggle, means for subjecting the toggle to endwise pressure, circuit contacts, means to bridge said contacts when said toggle collapses, and a flexible filament passing through longitudinal bores in the struts to enable the toggle to be reset after collapse.

2. In fire extinguishing apparatus, an inertia control device comprising a pair of relatively movable abutments, means for urging the abutments towards one another, a pair of struts which are mounted between the abutments substantially in line to constitute a toggle subjected to endwise pressure, and of which at least one is in abutting engagement with the end of the strut adjacent to it, circuit contacts, means to bridge said contacts when said toggle collapses, and a flexible filament passing through longitudinal bores in the struts to enable the toggle to be reset after collapse.

RICHARD ALURED DENNE.